Figure 6:
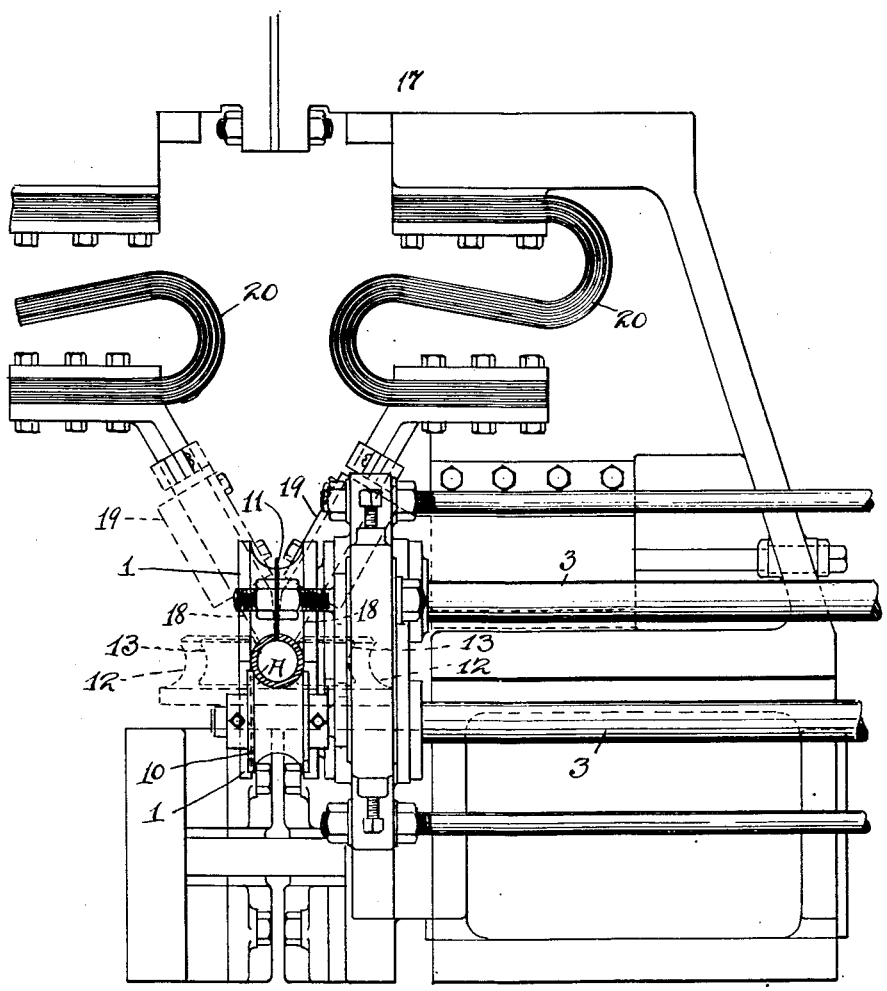

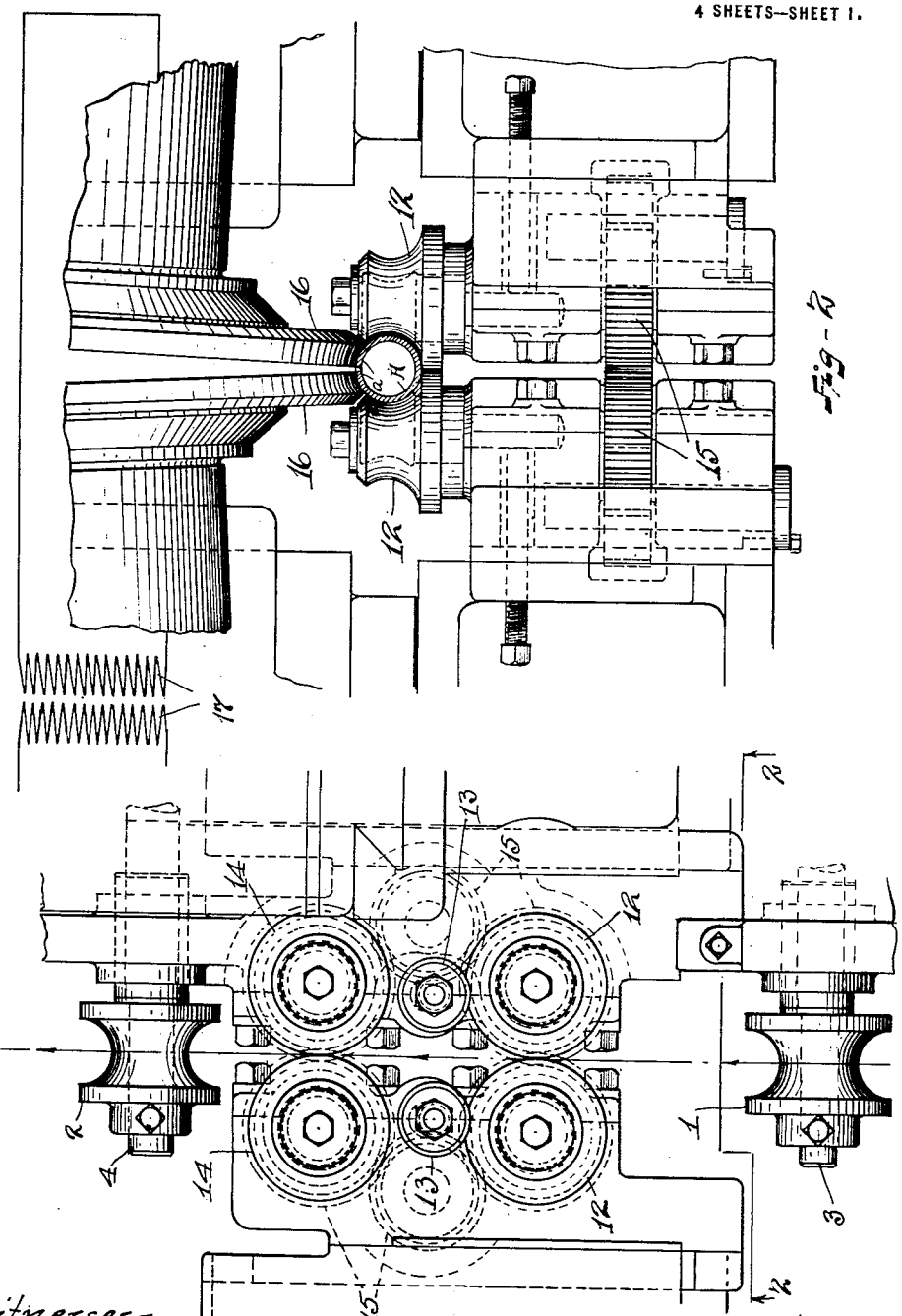

H. E. BUTCHER.
METHOD OF AND APPARATUS FOR WELDING.
APPLICATION FILED DEC. 22, 1913.
1,205,511.
Patented Nov. 21, 1916.
4 SHEETS—SHEET 2.
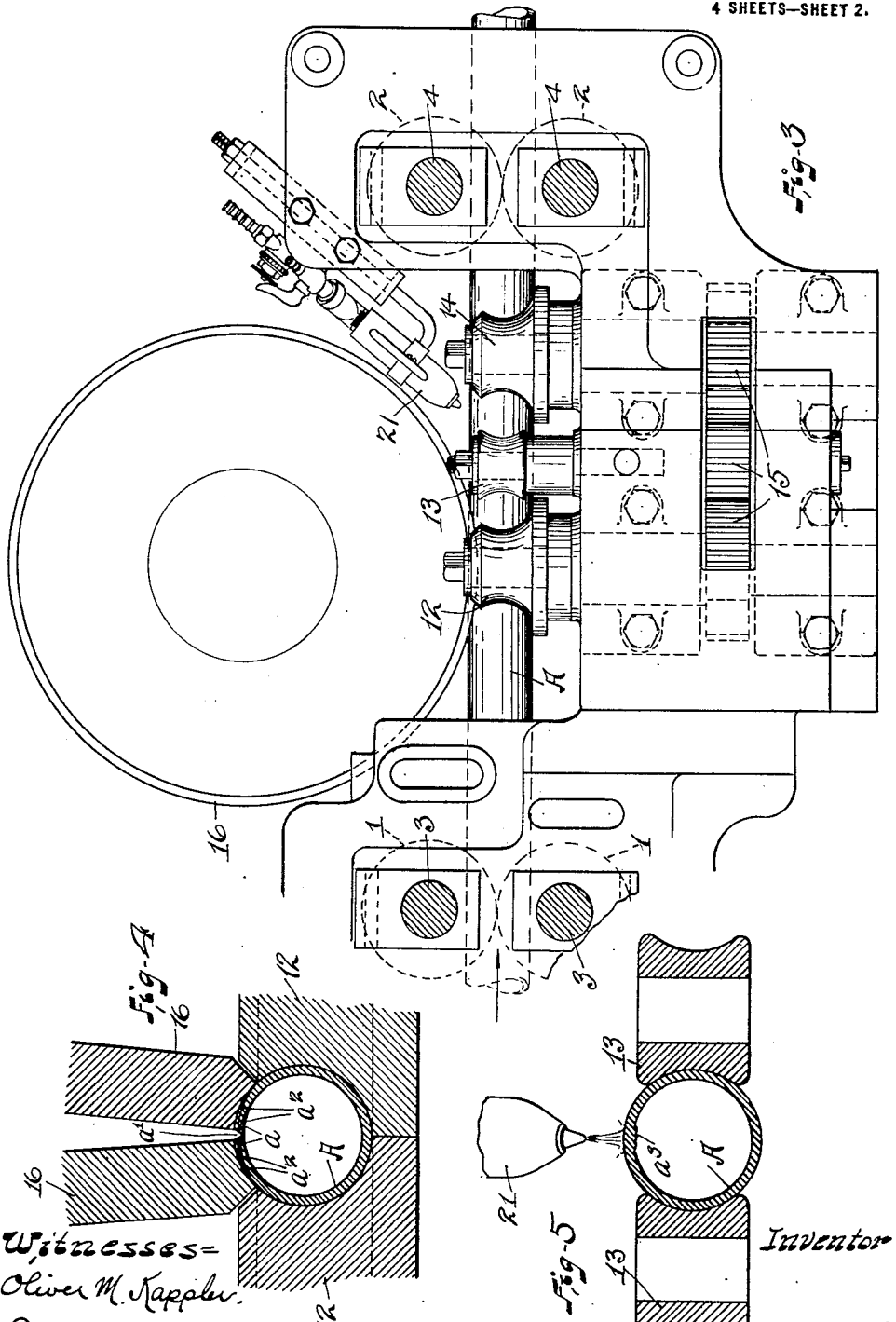

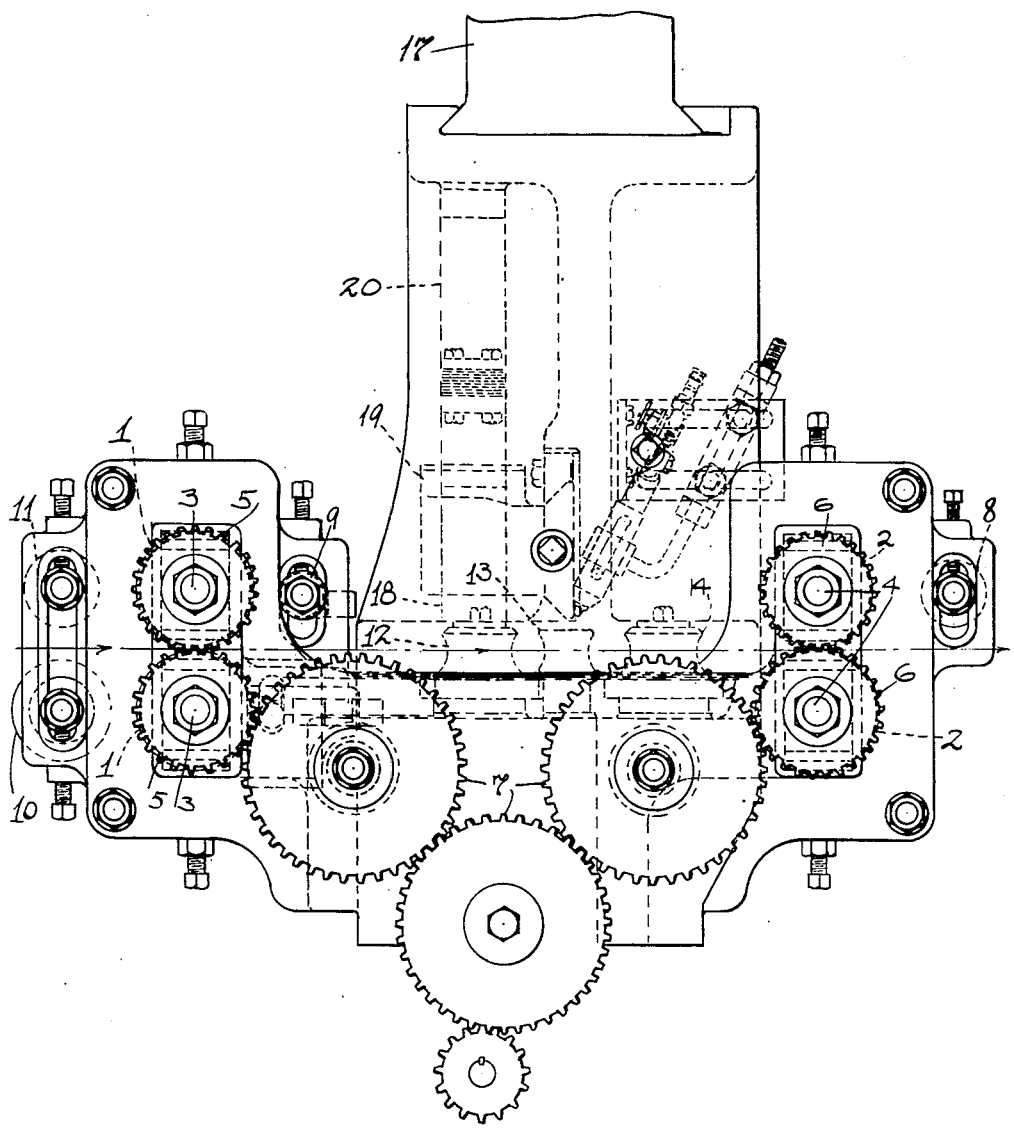

UNITED STATES PATENT OFFICE.

HARRY E. BUTCHER, OF CLEVELAND, OHIO, ASSIGNOR TO THE STANDARD WELDING COMPANY, OF CLEVELAND, OHIO, A CORPORATION OF OHIO.

METHOD OF AND APPARATUS FOR WELDING.

1,205,511.   Specification of Letters Patent.   Patented Nov. 21, 1916.

Application filed December 22, 1913. Serial No. 808,132.

*To all whom it may concern:*

Be it known that I, HARRY E. BUTCHER, a citizen of the United States, and a resident of Cleveland, county of Cuyahoga, State of Ohio, have invented a new and useful Improvement in Methods of and Apparatus for Welding, of which the following is a specification, the principle of the invention being herein explained and the best mode in which I have contemplated applying that principle, so as to distinguish it from other inventions.

In the present approved method of manufacturing tubing by electric welding process, substantially the following steps are involved, viz., the strip steel is run through a forming machine whereby such strip is rolled or otherwise formed into tubular shape with the edges which are to be joined in abutting relation. Afterward, such preliminarily formed tube is run through a welding machine, such machine comprising pressure rolls arranged to contact laterally with the tube, whereby its abutting edges are held in forceful contact while a heating electric current is passed across the same by means of electrode rolls arranged to contact with the respective edges of such tube. By the foregoing means such abutting edges are heated to a fused state under pressure, thereby forming a welded joint, which, however, is not smooth but shows a bur on the outer and inner surfaces of the tube along the line of the weld.

In the practice of the foregoing method of manufacturing tubing electrically, a number of difficulties are encountered, as a result of which either no weld at all is made at points along the joint, or in other cases holes are burned in the tube, so that a considerable amount of scrap results. Not all of the reasons for the difficulties thus encountered are readily apparent, but it would seem that one such difficulty in securing a perfectly welded joint is due to certain imperfections in the flat stock as well as to imperfections in the method of welding itself. For example, the material is not infrequently laminated, such laminations extending beyond the contact rolls and being of a character such as to prevent the passage, or at least the free passage, of the current from one lamina to another. Consequently, the heating current, instead of passing through the whole cross-section of the abutting edges, passes through only a part of such edges, thereby overheating such part and not heating the remainder at all. Again there is sometimes scale, or dirt, or stains along the edges of the tubular shape which is to be welded, these imperfections serving to interfere with the electrical contact of the rolls with the tube, or of the edges with each other, so that such edges are not raised to the temperature necessary to fuse them together. Still another reason for the unsatisfactory results encountered in the practice of the foregoing described method, lies in the fluctuating character of the current which is ordinarily available for the heating operation, and a difficulty, arising from the same source, is encountered where an electric motor is relied on to feed the tubing through the welding machine, it being very difficult to properly correlate the rate of feed with the heating operation, so that an entirely perfect weld will be progressively formed between the meeting edges of the tube.

By the improved method and apparatus for welding, which I have devised, I am enabled to substantially overcome all of the foregoing difficulties encountered in carrying on the prevailing method, such improved method combining with the use of electric heating means, of a second heating agency, preferably a gas flame, such as that produced by an oxy-acetylene blow pipe. The rate of feed of the tube being welded and the rate of flow of heating electric current will be so correlated as not to bring the abutting edges of the tube fully to a welding temperature by this heating agency. In other words, the current, that goes across and through the tubular formed shape, simply heats the edges to a temperature a little below that necessary to fuse the same together; the complete fusion then is produced by playing a gas flame on such preliminarily heated edges.

In practically carrying out the foregoing process, I employ the steps and means hereinafter fully described and particularly pointed out in the claims.

The annexed drawing and the following description set forth in detail certain mechanism embodying the invention, such disclosed means constituting, however, but one of various ways in which the principle of the invention may be used.

In said annexed drawings:—Figure 1 is a plan view of the tube feeding mechanism in a typical welding apparatus, or machine, adapted for the carrying out of my present improved process, the welding means proper being omitted in order not to confuse the drawing; Fig. 2 is a front elevational view of such apparatus with the electric heating means shown in operative relation to a tube held by the feeding mechanism; Fig. 3 is a side elevational view corresponding with Figs. 1 and 2, but showing both the electric and the gas-flame heating agencies; Figs. 4 and 5 illustrate in enlarged cross-section the manner in which the welded joint is formed, according to my improved process; Fig. 6 is a front elevational view corresponding to Fig. 2, but showing a modification in the form of the electric heating means; while Fig. 7 is a side elevational view of such modified form of apparatus.

According to my present improved process, the strip metal is preliminaryily formed into a tube blank A with the edges a in proper abutting relation, as shown in Fig. 4, for example. Such blank tubing is then fed through the machine illustrated in the foregoing drawings, whereby the aforesaid abutting edges are welded together by being preliminarily brought to an approximate welding temperature by one heating agency, and then immediately brought to a complete state of fusion by a second heating agency. It will, of course, be understood that the step of preliminarily forming the tube may be accomplished either separately, or simultaneously and in unison with the welding operation, as may be found most convenient. This forming step is not illustrated, since it is not directly involved as a part of the present invention. For feeding the tubing through the welding machine past such heating agencies, a series of feed rolls arranged in pairs are employed, one pair 1, 1, being located forwardly and another 2, 2, to the rear of the point or points where the welding proper occurs, said two sets of feed rolls being respectively carried on horizontally disposed spindles or shafts 3, 3 and 4, 4 which are connected to be driven in unison in the proper directions by means of gears 5, 5, 6, 6 and 7 such as illustrated in Fig. 7. This feeding mechanism, it will be understood, is substantially the same in both forms of the machine illustrated in the drawings.

In addition to such two sets of feed rolls there may also be provided suitable guide rolls 8, 9 and 10, and in conjunction with one of the latter a disk 11 arranged to engage the groove a' formed between the meeting edges a of the tubing before such edges are welded together, the function of this disk being to retain the tube in proper axial relation to the welding agencies. This disk, as also the guide rolls, are illustrated in Figs. 6 and 7 only.

Between the two sets of feed rolls 1, 1, and 2, 2, I provide a plurality of pressure rolls arranged in pairs, three such rolls 12, 13 and 14 being shown on each side of the line of the tubing. The function of these rolls is partly to assist in the feeding operation and principally to retain the abutting edges of the tubing in such forceful contact that not only may an electric current be preliminarily passed from one side of the joint to the other across such edges, but, also, so that after the latter have been fused they will be pressed together and a homogeneous junction formed therebetween. As illustrated, the first two and the last two pairs of these pressure rolls are intergeared by gears 15 and arranged to be positively driven, just as the feed rolls proper; while the intermediate pair of such pressure rolls are simply idler rolls.

The means for conveying the electric current to the tube comprise two welding electrodes, which may take on the form of relatively large disks 16, the edges of which are of proper cross-section to conform with the shape of the tube being welded, as shown in Fig. 2. The manner in which these electrodes are supported, as well as the way in which current is supplied thereto, are of no interest in the present connection, it being understood that they are suitably connected with a source of electric current, specifically with the secondary of a transformer 17 shown in diagrammatic fashion in said Fig. 2, the preferred location of such transformer being indicated in Figs. 6 and 7, as above the welding apparatus.

In place of disk electrodes, such as have just been described, it may be found advantageous to employ electrodes 18 adapted to have a sliding contact with the tube, since thereby not only is a better contact insured, but a contact of increased area as well. Where such sliding electrodes 18 are used, the arrangement will be substantially as shown in Figs. 6 and 7, the electrodes being slidably held in guides 19 disposed in angular relation with each other, so that the lower ends of the electrodes may sustain substantially the same relation to the tube as the edges of the disks, such electrode ends being fashioned the same as are the disks to conform with the section of the particular tube being welded. Where slidably mounted electrodes are thus employed the laminated copper conductors 20 which connect the electrodes with the transformer 17 may take the form of springs as shown in Fig. 6 and thus assist in maintaining the proper degree of pressure between the electrodes and the work.

Whether rolling or sliding electrodes be thus employed, they will be preferably arranged so as to contact with the work at a point substantially adjacent to the foremost pair 12, 12 of pressure rolls, and the character and rate of flow of the current will be so gaged, having regard to the rate at which the work is being fed through the machine, that the edges of the tube will be heated very nearly, but not quite, to the temperature at which incipient fusion would occur.

Located immediately to the rear of the electrodes 16, 16 or 18, 18, as the case may be, is a burner 21 shown as an oxy-acetylene burner, whereby a gas flame of high temperature may be directed upon the abutting edges of the tube thus preliminarily raised very nearly to the point of fusion. Very little additional heat being necessary to effect such fusion, this condition is almost instantly brought about by the application of the gas flame, and as the tube passes between the last of the pressure rolls, its edges are forced together into intimate contact thereby producing a homogeneous juncture.

Ordinarily the joint may be expected to "set" by the time it has passed the third set 14, 14 of pressure rolls, but additional rolls, or equivalent means, may be provided to continue the application of pressure still further, and cooling means (not shown), such as a stream of water, may be applied to the joint after it has passed such third set of rolls in order to cool it down below the fusion point.

The action of the respective heating agencies which I thus employ is well illustrated in Figs. 4 and 5, and in the former of said figures I have further attempted to show, so far as it is possible in a drawing, the character of the laminations $a^2$ which are frequently encountered in the material used in forming tubes with the attendant difficulties already discussed. As shown in this figure, the electrode at the right of the joint, for example, has adequate contact only with the outer lamination, so that the inner edge of the tube on that side of the joint is substantially cut off from the heating current. Irrespective of whether this occurs or not, the complete fusion of the edges is sedulously avoided under my method, although a temperature approaching that of such fusion is desired. Acordingly, the gas flame, when applied, comes into contact not merely with the outer surface of the tube, but plays along the very edges themselves forming, as they do, the walls of the V-shaped groove $a'$, thus readily completing the work of fusion both at points where the full heating effect of the electric current has been enjoyed and at the points where, owing to laminations in the material, or other obstructions to the perfect flow of the current, such preliminary heating has not been as successful as it might have been.

Not only do I obtain a much more perfect and uniformly satisfactory weld by the employment of two heating agencies of the kind referred to above, but the rate at which tubing can be welded is considerably increased, and at the same time the cost of welding decreased. It is well understood that electricity affords the most convenient and cheapest means of welding tubing, it having been demonstrated in actual practice that oxy-acetylene, which is the only substitute known, costs a good deal more and is not nearly as rapid when used alone. By combining with electricity, however, an oxy-acetylene blow pipe, which is used merely to complete the welding operation, a speed of operation equal to, or even greater than that obtainable with the current alone can be utilized, and at the same time only a relatively small amount of oxy-acetylene is required, since it merely puts the finishing touch, as it were, upon the welding operation, and is not used to preliminarily heat the parts to be joined. With the use of oxy-acetylene, or similar gas-flame, moreover, I have found that the bur $a^3$ (Fig. 5) produced along the welded seam is much less prominent than where electricity alone is relied on to perform the welding.

It will be understood that the process is not necessarily limited to the production of tubes, since metallic articles which can have the surfaces, that are to be welded, brought together in an analogous fashion to that above described, can be advantageously welded by the conjoint use of the heating electric current and gas-flame or igneous blast in the fashion hereinbefore set forth. For the purpose of this specification and the following claims, accordingly, the respective edge portions of the tube may be regarded simply as two metallic articles, although they form part of the same tube. It will also be understood that the process is not necessarily limited to the direct contact of the abutting edges which are to be welded together, but that a strip of solder or brazed material may be inserted therebetween in certain classes of work.

Other modes of applying the principle of my invention may be employed instead of the one explained, change being made as regards the steps or mechanism herein disclosed, provided the means stated by any of the following claims or the equivalent of such stated means be employed.

I therefore particularly point out and distinctly claim as my invention:—

1. The method of welding metal articles together, which consists in maintaining said articles with the faces to be welded in partial contact under pressure; raising such articles to a temperature short of fusion by passing a heating electric current through the same across the point of contact; and then completing such fusion by directing an igneous blast onto such faces and continuing the pressure, whereby such faces are welded together.

2. The method of welding metallic articles together, which consists in maintaining said articles with the faces to be welded in approximate line contact under pressure; raising such articles along such line of contact to a temperature short of fusion by passing a heating electric current through the same across such line; and then completing such fusion by directing an igneous blast onto such faces and continuing the pressure, whereby such faces are welded together.

3. The method of welding metallic articles together, which consists in maintaining said articles with their edges abutting under pressure; raising such abutting edges of the articles to a temperature short of fusion by passing a heating electric current through such articles and across such abutting edges progressively along the latter; and then completing such fusion by directing an igneous blast progressively along such edges.

4. The method of welding metallic articles together, which consists in maintaining said articles with their edges abutting under pressure and forming a V-shaped groove; raising such abutting edges of the articles to a temperature short of fusion by passing a heating electric current through such articles and across such abutting edges progressively along the latter; and then completing such fusion by directing a gas flame progressively along such V-shaped groove immediately following the passage of such electric current.

5. In the manufacture of metallic tubing, the steps which consist in maintaining a preliminarily formed tube with its edges abutting under pressure; raising such abutting edges to a temperature short of fusion by passing a heating electric current through such tube and across such abutting edges progressively along the latter; and then completing such fusion by directing an igneous blast progressively along such edges immediately following the passage of such electric current.

6. In the manufacture of metallic tubing, the steps which consist in maintaining a preliminarily formed tube with its edges abutting under pressure and forming a V-shaped groove; raising such abutting edges to a temperature short of fusion by passing a heating electric current through such tube and across such abutting edges progressively along the latter; and then completing such fusion by directing an igneous blast progressively along such V-shaped groove immediately following the passage of such electric current.

7. In apparatus of the character described, the combination of means adapted to maintain the articles to be welded in contact, edge on, under pressure; electrodes disposed to contact with such articles adjacent to such edges, whereby a heating electric current may be passed across the latter, such current being regulated to raise such edges to a temperature short of fusion; means located closely adjacent to said electrodes and adapted to direct along such contacting edges an igneous blast adapted to complete such fusion; and means adapted to effect relative movement between said articles on the one hand and said electrodes and blast on the other.

8. In apparatus of the character described, the combination of means adapted to maintain the articles to be welded in contact, edge on, under pressure; electrodes disposed to slidably contact with such articles, whereby a heating electric current may be passed across the latter, such current being regulated to raise such edges to a temperature short of fusion; a blow-pipe located closely adjacent to said electrodes and adapted to direct along such contacting edges a gas-flame adapted to complete such fusion; and means adapted to move said articles relatively to said electrodes and blow-pipe so as to bring such edges progressively opposite the same.

9. In apparatus of the character described, the combination of means adapted to maintain a preliminarily formed tube with its edges abutting under pressure; electrodes disposed to contact with such tube adjacent to such edges, whereby a heating electric current may be passed across the latter, such current being regulated to raise such edges to a temperature short of fusion; means located closely adjacent to said electrodes and adapted to direct along such contacting edges an igneous blast adapted to complete such fusion; and means adapted to effect relative movement between such tube on the one hand and said electrodes and blast on the other.

10. In apparatus of the character described, the combination of means adapted to maintain a preliminarily formed tube with its edges abutting under pressure; electrodes disposed to slidably contact with such tube adjacent to such edges, whereby a heating electric current may be passed across the latter, such current being regulated to raise such edges to a temperature short of fusion; a blow-pipe located closely adjacent to said electrodes and adapted to complete such fusion; and means adapted to move such tube relatively to said electrodes and blow-pipe so as to bring such edges progressively opposite the same.

Signed by me, this 18 day of December, 1913.

H. E. BUTCHER.

Attested by—
 A. J. LEITH,
 M. H. WILLIAMS.